(12) United States Patent
Ritz et al.

(10) Patent No.: US 11,130,528 B2
(45) Date of Patent: Sep. 28, 2021

(54) REAR PANELING FOR A ROAD VEHICLE WITH A REVERSING CAMERA

(71) Applicant: Dr. Ing. h.c. F. Porsche Aktiengesellschaft, Stuttgart (DE)

(72) Inventors: Thomas Ritz, Nufringen (DE); Dominik Thum, Pforzheim (DE); Ralf Goebel, Gerlingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 90 days.

(21) Appl. No.: 16/777,965

(22) Filed: Jan. 31, 2020

(65) Prior Publication Data

US 2020/0247476 A1 Aug. 6, 2020

(30) Foreign Application Priority Data

Feb. 6, 2019 (DE) ...................... 10 2019 102 893.0

(51) Int. Cl.
*B62D 25/08* (2006.01)
*B60R 11/04* (2006.01)
*B60R 11/00* (2006.01)

(52) U.S. Cl.
CPC .............. *B62D 25/08* (2013.01); *B60R 11/04* (2013.01); *B60R 2011/004* (2013.01)

(58) Field of Classification Search
CPC .... B62D 25/08; B60R 11/04; B60R 2011/004
See application file for complete search history.

(56) References Cited

U.S. PATENT DOCUMENTS

| 8,191,944 | B2 | 6/2012 | Rinklin | |
|---|---|---|---|---|
| 10,214,156 | B2 | 2/2019 | Moenig et al. | |
| 2013/0162028 | A1* | 6/2013 | Bierley | B60R 11/04 307/10.1 |
| 2017/0313167 | A1* | 11/2017 | Fuchs | B60J 5/107 |

FOREIGN PATENT DOCUMENTS

| DE | 10 2015 117 777 | 11/2016 |
|---|---|---|
| DE | 10 2015 115 606 | 3/2017 |

OTHER PUBLICATIONS

German Search Report dated Oct. 11, 2019.

* cited by examiner

*Primary Examiner* — Lori L Lyjak
(74) *Attorney, Agent, or Firm* — Gerald E. Hespos; Michael J. Porco; Matthew T. Hespos

(57) ABSTRACT

A rear paneling for a road vehicle has U-shaped extruded profiles (11, 12) mounted on the crossmember of the road vehicle and runners fit next to the reversing camera (20) for raising the reversing camera (20) over a solid body colliding with the rear paneling (10).

9 Claims, 3 Drawing Sheets

REAR PANELING FOR A ROAD VEHICLE WITH A REVERSING CAMERA

CROSS REFERENCE TO RELATED APPLICATION

This application claims priority under 35 USC 119 to German Patent Appl. No. 10 2019 102 893.0 filed on Feb. 6, 2019, the entire disclosure of which is incorporated herein by reference.

BACKGROUND

Field of the Invention

The invention relates to a rear paneling for a road vehicle. Reversing systems serve to assist the driver of a road vehicle when reversing, in particular as parking aids. Systems of the generic type have been used for some years, especially in vehicles that are not wholly observable such as trucks, coaches and commercial vehicles. Reversing systems recently also have become established in automobiles.

Related Art

A reversing system consists generally of a rear-view video camera (below: "reversing camera"), a monitor, a cable harness and, in the case of high-grade specifications, a control box that prevents an overvoltage. Commercially available reversing systems are operated with a voltage between 12 and 24 volts.

Video reversing systems eliminate the blind spot behind a vehicle and thus reduce the risk of an accident when the vehicle moves back. Images are recorded by the rear camera and transmitted by cable or radio to a monitor visible for the driver. Thus, it is possible without the help of third parties to detect whether, for example, a pedestrian or stationary obstacle is located behind the vehicle. The intention is to avoid physical damage and injuries in this way.

With respect to possible damage to the rear paneling, DE 10 2015 115606 A1 proposes a support part with foam inserts. U.S. Pat. No. 8,191,944 B2 describes a similar impact protection element.

SUMMARY

The invention provides a rear paneling for a road vehicle with a reversing camera. One advantage of the invention is improved protection of the camera and license-plate lamps.

One embodiment of the invention is illustrated in the drawings and will be described in more detail below.

DETAILED DESCRIPTION

Considered together, FIGS. 1 to 4 illustrate the basic structural features of the rear paneling 10 of a road vehicle with a reversing camera 20.

Figure 1:
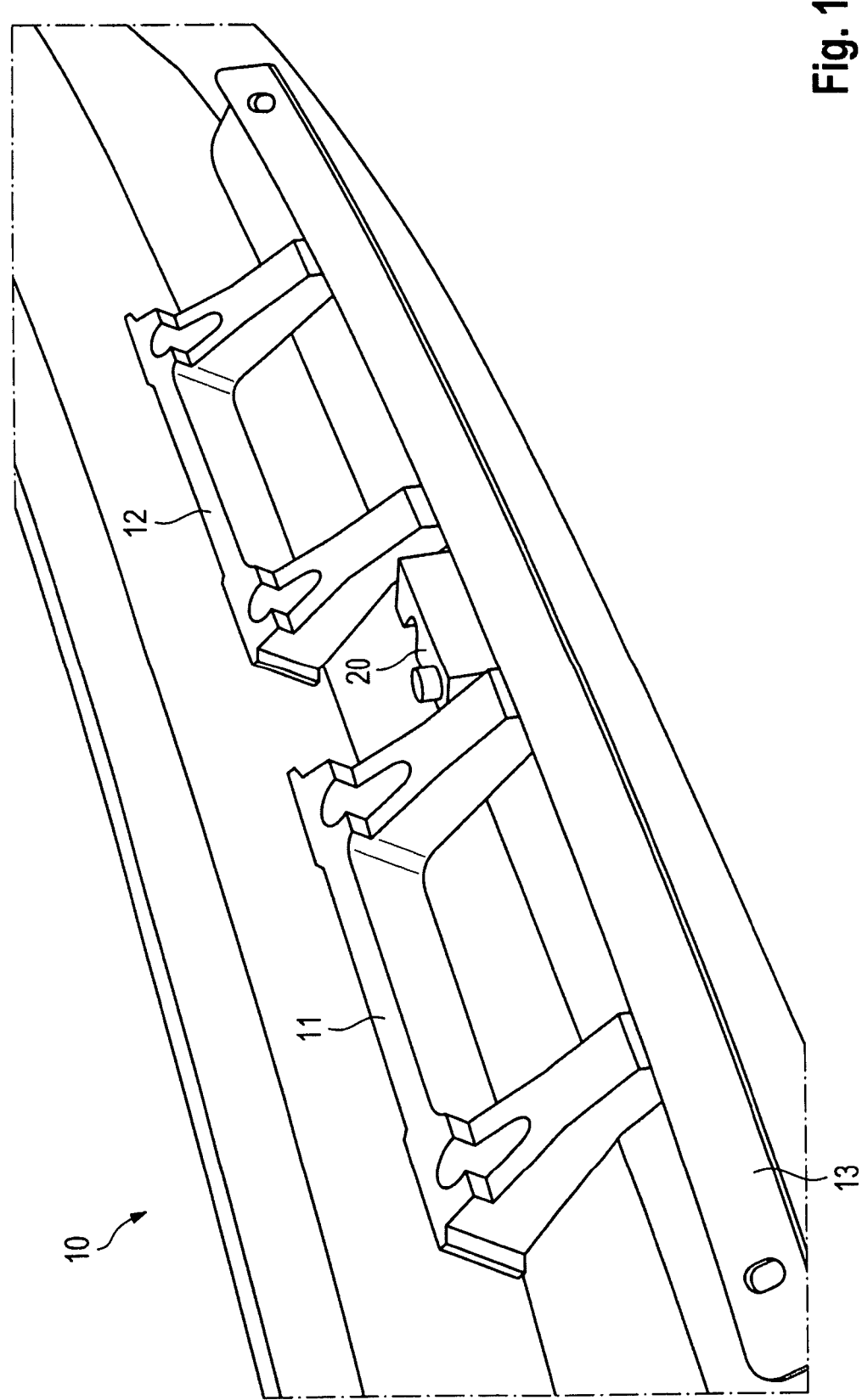
FIG. 1 is a partially transparent partial view of a rear paneling.

FIG. 1 shows U-shaped extruded profiles 11, 12 formed, for example, from an aluminum alloy and fastened to the crossmember of the road vehicle on both sides of the reversing camera 20. Each of the extruded profiles 11, 12 is solid. A steel doubler plate 13 with a thickness of 2 mm connects the extruded profiles 11, 12 parallel to the pitch axis of the road vehicle. The doubler plate 13 functions to distribute mechanical loading onto the extruded profiles 11, 12.

Figure 2:
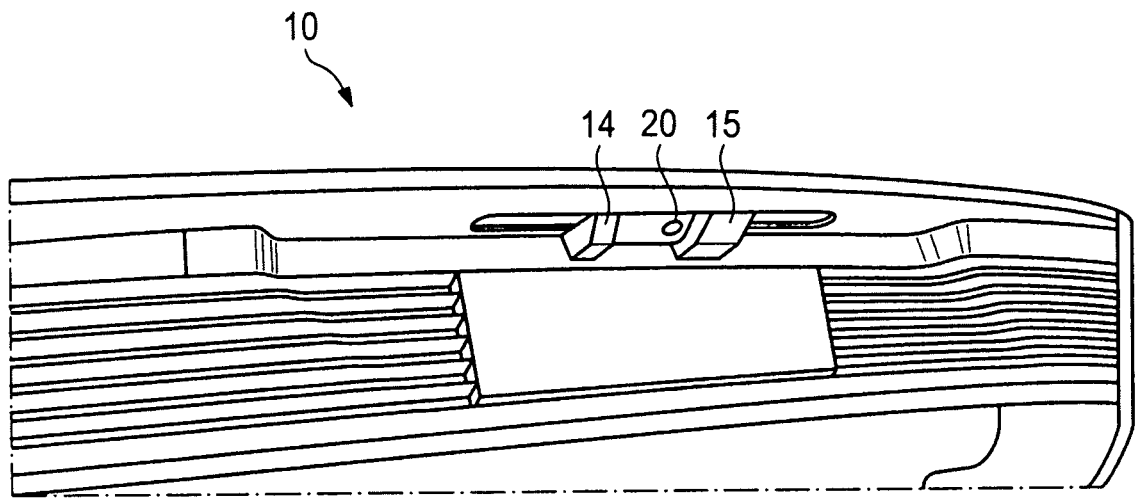
FIG. 2 is a second partial view of the paneling according to FIG. 1.
Figure 3:
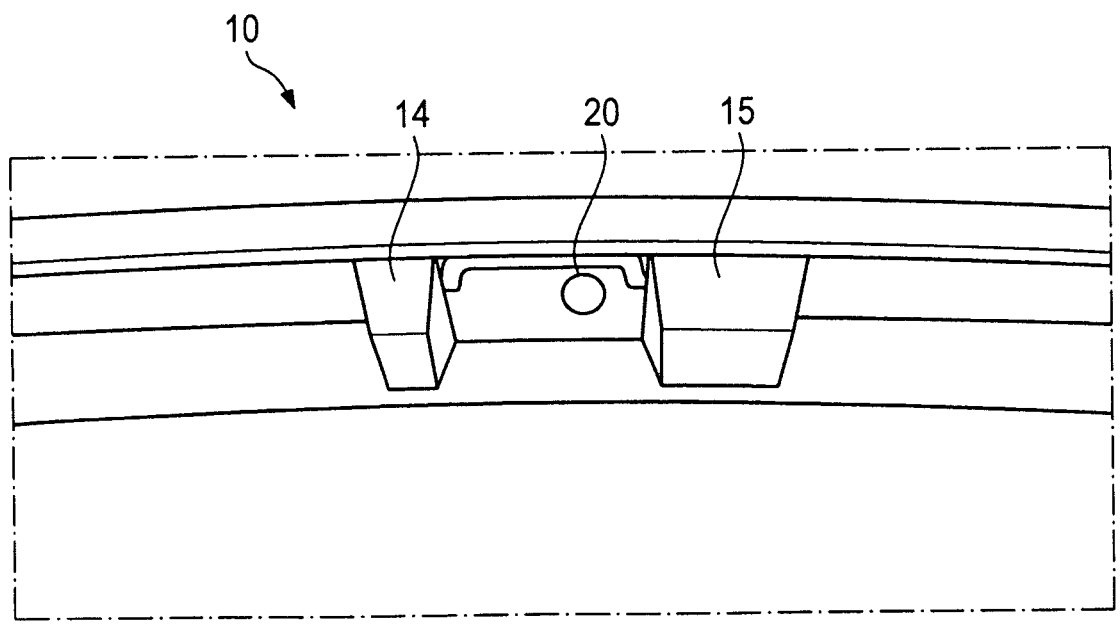
FIG. 3 is a third partial view of the paneling of FIG. 1.
Figure 4:
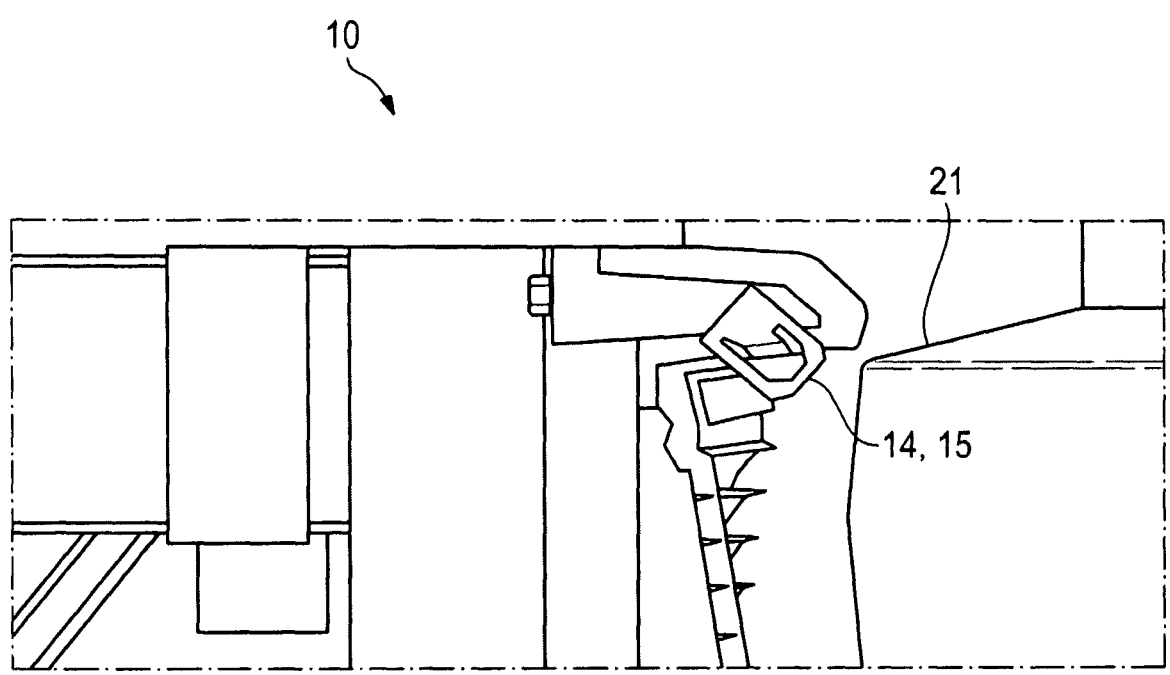
FIG. 4 is a cross section of the paneling before the impact of a solid body.

Two runners 14, 15 are fit next to the reversing camera 20 and are visible especially in FIGS. 2 and 3. The runners 14, 15 serve to raise the reversing camera 20 above a solid body 21 (FIG. 4) colliding with the rear paneling 10. The runners 14, 15 of the present embodiment consist of a glass fiber-reinforced polyamide with a glass fiber content of 30% and have a wall thickness of 4.5 mm. Both runners 14, 15 are ribbed on the inside and are fastened with screws, the axes of which run parallel to the roll axis and yaw axis of the road vehicle.

What is claimed is:

1. A rear paneling for a road vehicle with a reversing camera, comprising:
    U-shaped extruded profiles fastened to a crossmember of the road vehicle and
    runners fit next to the reversing camera for raising the reversing camera over a solid body colliding with the rear paneling.
2. The rear paneling of claim 1, further comprising:
    a doubler plate for distributing mechanical loading onto the extruded profiles.
3. The rear paneling of claim 2, wherein:
    the doubler plate consists of steel.
4. The rear paneling of claim 2, wherein:
    the doubler plate has a thickness of 2 mm.
5. The rear paneling of claim 1, wherein:
    the extruded profiles consist of an aluminum alloy.
6. The rear paneling of claim 1, wherein:
    the extruded profiles are solid.
7. The rear paneling of claim 1, wherein:
    the runners consist of a glass fiber-reinforced polyamide.
8. The rear paneling of claim 7, wherein:
    the runners have a wall thickness of 4.5 mm.
9. The rear paneling of claim 1, wherein:
    the runners are ribbed on an inside and
    the runners are fastened respectively with screws oriented in pairs at right angles with respect to one another.

* * * * *